3,189,464
BLUE CHEESE SALAD DRESSING

Burdet Heinemann, Springfield, Mo., assignor to Producers Creamery Company, Springfield, Mo., a corporation of Missouri
No Drawing. Filed Dec. 14, 1962, Ser. No. 244,599
8 Claims. (Cl. 99—116)

This invention relates to an improved blue cheese type salad dressing. More particularly, this invention relates to a salad dressing of improved blue cheese flavor, texture and appearance and to a method for preparing said salad dressing.

Blue cheese dressing is normally made by blending salad oil, vinegar, blue cheese, e.g., Roquefort cheese, sugar, salt, eggs and starches. This is usually accomplished by preparing two mixtures, a starch paste and an emulsion base. A description of this procedure may be found in the Chemical Formulary, vol. 8, pages 189–190, 1948. A similar technique is also described in Food Energy, vol. 15, pages 256–262, 1961. These references describe the manufacture of salad dressings in general.

Basically, a salad dressing is a mixture of vegetable oil and an aqueous solution of a food acid such as acetic acid (vinegar) and citric acid (lemon juice). To the mixture may be added certain emulsifiers, stabilizers and flavorings as desired. Many dressings include cooked starch as a thickening or bodying agent.

In the manufacture of salad dressings containing blue cheese, a problem is usually encountered in preserving the appearance of the finished dressing. During preparation, the blue cheese is broken up and mixed with the finished dressing, usually at the time of use. As served in homes and restaurants, the cheese is usually in chunks or pieces up to ¼ inch in size and the particles of cheese are readily apparent, thereby serving to identify the dressing as a blue cheese or Roquefort cheese dressing along with the characteristic flavor. Attempts to duplicate this appearance commercially, however, have not been successful. For example, the blue cheese is usually mixed with the starch paste before cooking and this mixture blended with the emulsion base. In this case, however, the blue cheese melts and the cheese particles lose their identity. In any event, preparation of commercial sizes batches requires pumping and excessive agitation which breaks up the identifying particles of cheese to a point where identity disappears.

It is therefore an object of the present invention to provide a salad dressing having the characteristic flavor, texture and appearance of a freshly prepared blue cheese dressing.

It is another object of this invention to provide an improved method for the preparation of blue cheese type salad dressings.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has been found that the above objects may be attained by the addition of a quantity of dry curd cottage cheese to blue cheese salad dressing. This addition enhances the flavor while providing uniform cubes or particles of soft cheese which are attractive to the eye and impart a pleasing particulate nature to the dressing as it is dipped or poured from its container. Preferably, the cottage cheese is added in an amount from 0.5 to 30% by weight of the dressing.

The process for the manufacture of blue cheese is described in Bulletin 324 (1935) of the Iowa Agriculture Experiment Station, Ames, Iowa, and is also included in my copending application Serial No. 127,869, filed July 31, 1961, now U.S. Patent No. 3,108,879. A procedure for manufacturing cottage cheese may be found in Market Milk and Related Products by H. H. Sommers (1938), pages 549–558. Cottage cheese as it appears on the market usually contains a cream dressing consisting of milk, cream and salt. As it is used in the present invention, however, the dressing is preferably omitted.

The salad dressing of the present invention may be prepared by following the conventional procedures noted above with the added step of blending a portion of dry curd cottage cheese into the final mixture. For example, blue cheese is mixed with certain ingredients which are cooked to produce a starch paste. This mixture is then blended with an emulsion base formed of other ingredients. The cottage cheese is finally added to the above blend.

It is preferred, however, to pasteurize a mixture of ingredients other than the cottage cheese. This mixture is then homogenized and cooled, resulting in a prepared salad dressing. A second mix consisting of water, vinegar and cottage cheese is then heated to temperatures below pasteurization and blended with the prepared salad dressing. If desired, a small amount of dried cultured mycelial pellets of *Penicillium roqueforti* may be added to the cottage cheese mix.

Example 1

The following mixture was heated to 185° F. for five minutes, cooled to 160° F., homogenized at 1,000 pounds pressure and cooled at 45° F.:

| Ingredient: | | Amount |
|---|---|---|
| Potato starch | grams | 27.0 |
| Blue cheese | do | 230.0 |
| Corn oil | do | 225.0 |
| Water | do | 373.0 |
| Salt | do | 20.0 |
| Egg yolk (powdered) | do | 12.0 |
| Vinegar | do | 13.0 |
| Citric acid | do | 11.0 |
| Potassium sorbate | do | 0.8 |
| Emulsifier (Tween 80) | milliliters | 4.5 |

Tween 80 is a polyoxyalkylene derivative of sorbitan monooleate and is a nonionic surface active agent available from the Atlas Powder Co.

The following mixture was then prepared, heated to 130° F. for five minutes and cooled:

| | | |
|---|---|---|
| Water | ml | 91.0 |
| Cottage cheese | gm | 70.0 |
| Vinegar | ml | 3.5 |
| Dried mycelium of *P. roqueforti* | gm | 0.5 |

These two mixtures were then blended and packaged.

Many variations may be made in the composition and method noted in Example 1 without departing from the spirit of the invention. For example, in the first mixture the potato starch may have substituted therefor any one or a mixture of the following: tapioca starch, arrow root starch, guar gum and locust bean gum. Instead of the corn oil, any edible vegetable oil or mixtures thereof may be used such as cottonseed oil, peanut oil and olive oil. Similarly, other emulsifiers which are suitable include acetylated monoglycerides, glycerol monostearate and polyoxyethylene stearate. The blue cheese may be replaced in whole or in part by natural or synthetic blue cheese flavoring. The flavoring is obtainable commercially in either a liquid or dry form, the strength of which may be adjusted by the addition of inert ingredients to correspond in flavoring power to the amount of blue cheese which is replaced. The potassium sorbate functions as a preservative and may be substituted, for example, by sodium benzoate. The egg yolk functions as an emulsifier and may be substituted in whole or part by lecithin, or omitted entirely.

*Example 2*

The procedure of Example 1 was repeated with the exception that the first mixture contained the following ingredients:

| Ingredient: | | Amount |
|---|---|---|
| Arrow root starch | grams | 50 |
| Blue cheese | do | 250 |
| Blue cheese flavoring | milliliters | 15 |
| Corn oil | grams | 225 |
| Water | do | 353 |
| Sugar | do | 30 |
| Salt | do | 18 |
| Egg yolk (powdered) | do | 14 |
| Vinegar | milliliters | 20 |
| Citric acid | grams | 7 |
| Sodium benzoate | do | 8 |
| Glycerol monostearate | do | 7 |
| Guar gum | do | 2 |
| Locust bean gum | do | 1.5 |

In the above examples, the first mixture may be heated to a temperature between about 130 and 205° F., preferably about 185° F. for from 0.05 to 60 minutes, preferably about five minutes. The mixture may be homogenized at pressures between about 100 and 3500 pounds, preferably about 1000 pounds and is then cooled to a temperature between about 32 and 110° F., preferably about 45° F. The second mixture may be heated to a temperature between about 60 and 160° F., preferably about 130° F. for from 0.05 to 60 minutes, preferably about five minutes and then cooled to a temperature between about 32 and 140° F., preferably about 70° F.

The compositions of Examples 1 and 2 indicate preferred salad dressings under the present invention.

However, it is to be understood that the ingredients may be used in the following preferred proportions, each by weight of the finished dressing:

| Ingredient: | Amount, percent |
|---|---|
| Starch | 0.1 to 7.0 |
| Blue cheese | 3 to 50 |
| Blue cheese flavoring | 0 to 10 |
| Vegetable oil | 5 to 40 |
| Water | 20 to 50 |
| Egg yolk (powdered) | 0 to 4 |
| Vinegar | 0.1 to 6 |
| Citric acid | 0.1 to 2 |
| Preservative | 0.01 to 0.4 |
| Emulsifier | 0.01 to .5 |

In the second mixture the water may be present in amounts from 1 to 20%, the cottage cheese from 0.5 to 30%, the vinegar from .001 to 5%, and the dried cultured mycelial pellets of *Penicillium roqueforti* from 0 to 0.2%, each by weight of the finished dressing. In this mixture, the function of vinegar is to reduce the pH of the heating mixture.

While my invention has been described above with reference to specific embodiments, it will be understood that the invention is not limited to such illustrated embodiments and may be variously practiced within the scope of the appended claims.

What is claimed is:

1. A salad dressing which has the appearance and texture of a freshly-prepared dressing of the type containing pieces of blue cheese, said dressing comprising: a homogenized salad dressing base containing a member selected from the group consisting of fluidized blue cheese, blue cheese flavoring and mixtures thereof; and a particulate member selected from the group consisting of particles of cottage cheese in curd form and mixtures thereof with dried cultured mycelial pellets of *Penicillium roqueforti*, said particulate member being dispersed in said base to produce the texture and appearance of dispersed blue cheese particles, said cottage cheese particles being present in an amount from about 0.5% to about 30% by weight.

2. A salad dressing according to claim 1 wherein blue cheese is present in an amount of from 3 to 50% by weight.

3. A salad dressing according to claim 1 wherein pellets of *Penicillium roqueforti* are present in an amount up to 0.2% by weight.

4. A method for the production of a salad dressing which has the appearance and texture of a freshly-prepared dressing of the type containing pieces of blue cheese, said method comprising: forming a mixture of vegetable oil, edible starch, emulsifier, an aqueous solution of a food acid selected from the group consisting of acetic acid, citric acid and mixtures thereof, and a member selected from the group consisting of blue cheese, blue cheese flavoring and mixtures thereof; heating said mixture to pasteurization temperature; homogenizing and cooling said mixture to form a prepared dressing; adding to said cooled homogenized mixture a particulate member selected from the group consisting of particles of cottage cheese in curd form and mixtures thereof with dried cultured mycelial pellets of *Penicillium roqueforti*; and dispersing said particulate member in said cooled homogenized mixture.

5. A method as in claim 4 wherein said cottage cheese is added in dry curd form.

6. A method as in claim 4 wherein said cottage cheese is added in an amount from about 0.5% to about 30% by weight.

7. A method as in claim 4 wherein said cottage cheese is added by dispersing the same in an aqueous medium and adding the resulting dispersion to said cooled homogenized mixture.

8. A method as in claim 7 wherein said aqueous medium is an aqueous solution of acetic acid.

References Cited by the Examiner

UNITED STATES PATENTS

| 2,617,730 | 11/52 | Long et al. | 99—117 |
| 2,882,168 | 4/59 | Rossi | 99—144 |
| 3,034,902 | 5/62 | Bavisotto | 99—117 X |
| 3,067,038 | 12/62 | O'Connell | 99—117 X |
| 3,100,153 | 8/63 | Knight | 99—116 |
| 3,108,879 | 10/63 | Heinemann | 99—144 X |

OTHER REFERENCES

Berolzheimer, "Culinary Arts Institute Encyclopedia Cookbook," 1948, Culinary Arts Institute: Chicago, p. 865.

A. LOUIS MONACELL, *Primary Examiner.*

BEATRICE H. STRIZAK, WILLIAM B. KNIGHT,
*Examiners.*